US011082576B2

(12) United States Patent
Takase et al.

(10) Patent No.: US 11,082,576 B2
(45) Date of Patent: Aug. 3, 2021

(54) IMAGE READING APPARATUS, IMAGE READING METHOD, AND IMAGE READING SYSTEM

(71) Applicant: SEIKO EPSON CORPORATION, Tokyo (JP)

(72) Inventors: Yuji Takase, Kitakyushu (JP); Kosuke Nomoto, Fukutsu (JP); Masaya Kobayashi, Umi-Machi (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 16/715,228

(22) Filed: Dec. 16, 2019

(65) Prior Publication Data

US 2020/0195800 A1 Jun. 18, 2020

(30) Foreign Application Priority Data

Dec. 17, 2018 (JP) .............................. JP2018-235837

(51) Int. Cl.
*H04N 1/00* (2006.01)

(52) U.S. Cl.
CPC ..... *H04N 1/00779* (2013.01); *H04N 1/00588* (2013.01); *H04N 1/00761* (2013.01); *H04N 2201/0081* (2013.01)

(58) Field of Classification Search
None
See application file for complete search history.

(56) References Cited

U.S. PATENT DOCUMENTS

| 4,222,069 | A | * | 9/1980 | Groetschel | G04G 15/006 235/375 |
| 4,266,122 | A | * | 5/1981 | Schmidhauser | G06K 7/10722 235/454 |
| 4,369,362 | A | * | 1/1983 | Groetschel | G04C 15/0054 235/454 |
| 5,218,459 | A | * | 6/1993 | Parulski | H04N 1/3875 358/451 |
| 5,673,126 | A | * | 9/1997 | Ando | H04N 1/00681 358/498 |
| 5,682,252 | A | * | 10/1997 | Ando | H04N 1/00795 358/461 |

(Continued)

FOREIGN PATENT DOCUMENTS

JP 2017092682 5/2017

*Primary Examiner* — Anh-Vinh T Nguyen
(74) *Attorney, Agent, or Firm* — Workman Nydegger

(57) ABSTRACT

An image reading apparatus includes a transportation unit configured to transport a document; a reading unit configured to read the document transported by the transportation unit; a medium placement unit which is positioned upstream of the reading unit in the transportation, and on which the document and a setting sheet that includes setting information for setting a condition of reading processing of the document are placed; a detection unit which is disposed in the medium placement unit, and is configured to detect the setting information from the setting sheet placed on the medium placement unit; and a control unit configured to control the reading processing, in which the control unit sets the condition of the reading processing based on the setting information detected by the detection unit, and executes, under the condition that is set, the reading processing including reading of the document by the reading unit.

8 Claims, 9 Drawing Sheets

(56) References Cited

U.S. PATENT DOCUMENTS

| | | | | |
|---|---|---|---|---|
| 5,961,226 A * | 10/1999 | Nishida | B41J 11/003 | 358/449 |
| 6,057,937 A * | 5/2000 | Shimizu | H04N 1/00681 | 358/296 |
| 6,160,609 A * | 12/2000 | Inoue | G03D 15/046 | 355/29 |
| 7,712,983 B2 * | 5/2010 | Matsuzaka | H04N 1/00198 | 400/62 |
| 2005/0094178 A1 * | 5/2005 | Anno | H04N 1/00244 | 358/1.13 |
| 2005/0174606 A1 * | 8/2005 | Matsueda | H04N 1/00212 | 358/402 |
| 2006/0017941 A1 * | 1/2006 | Momozono | H04N 1/00411 | 358/1.1 |
| 2006/0216088 A1 * | 9/2006 | Tanaka | B65H 7/04 | 399/377 |
| 2008/0055668 A1 * | 3/2008 | Hirayama | H04N 1/4076 | 358/461 |
| 2009/0021803 A1 * | 1/2009 | Tagawa | H04N 1/1013 | 358/488 |
| 2010/0032466 A1 * | 2/2010 | Nishimura | B41J 3/4075 | 226/1 |
| 2010/0053663 A1 * | 3/2010 | Qian | G06K 15/00 | 358/1.15 |
| 2010/0149587 A1 * | 6/2010 | Yoshida | H04N 1/00222 | 358/1.15 |
| 2010/0245944 A1 * | 9/2010 | Fukutome | H04N 1/00002 | 358/488 |
| 2011/0096370 A1 * | 4/2011 | Okamoto | H04N 1/031 | 358/444 |
| 2011/0109673 A1 * | 5/2011 | Usuda | B41J 2/04551 | 347/9 |
| 2011/0285078 A1 * | 11/2011 | Andoh | G03G 15/602 | 271/265.01 |
| 2013/0301083 A1 * | 11/2013 | Kaneda | H04N 1/00015 | 358/406 |
| 2015/0085330 A1 * | 3/2015 | Suese | H04N 1/00814 | 358/488 |
| 2015/0326743 A1 * | 11/2015 | Yabuuchi | H04N 1/00737 | 358/498 |
| 2016/0212282 A1 * | 7/2016 | Shikaze | H04N 1/00347 | |
| 2017/0001821 A1 * | 1/2017 | Sato | H04N 5/2257 | |
| 2017/0126911 A1 * | 5/2017 | Kogi | H04N 1/00724 | |
| 2017/0219980 A1 * | 8/2017 | Sato | G03G 15/50 | |
| 2017/0257503 A1 * | 9/2017 | Tsukada | H04N 1/00734 | |
| 2017/0308019 A1 * | 10/2017 | Nishino | H04N 1/00708 | |
| 2017/0318172 A1 * | 11/2017 | Matsuzaki | H04N 1/0009 | |
| 2017/0374205 A1 * | 12/2017 | Panda | H04N 1/00347 | |
| 2018/0086579 A1 * | 3/2018 | Andoh | H04N 1/0032 | |
| 2018/0275611 A1 * | 9/2018 | Momose | G04B 47/061 | |
| 2018/0376020 A1 * | 12/2018 | Shiota | H04N 1/00018 | |
| 2019/0102385 A1 * | 4/2019 | Tokita | G06F 16/164 | |
| 2019/0191037 A1 * | 6/2019 | Tsukahara | H04N 1/00087 | |
| 2019/0268497 A1 * | 8/2019 | Shikagawa | H04N 1/00082 | |
| 2020/0019103 A1 * | 1/2020 | Yasui | H04N 1/00681 | |
| 2020/0021704 A1 * | 1/2020 | Yasui | H04N 1/00702 | |
| 2020/0021705 A1 * | 1/2020 | Yasui | H04N 1/00702 | |
| 2020/0089148 A1 * | 3/2020 | Kondo | G03G 15/607 | |
| 2020/0137262 A1 * | 4/2020 | Kubo | H04N 1/00588 | |
| 2020/0379688 A1 * | 12/2020 | Sugiura | G06F 3/1205 | |

* cited by examiner

IMAGE READING APPARATUS, IMAGE READING METHOD, AND IMAGE READING SYSTEM

The present application is based on, and claims priority from JP Application Serial Number 2018-235837, filed Dec. 17, 2018, the disclosure of which is hereby incorporated by reference herein in its entirety.

BACKGROUND

1. Technical Field

The present disclosure relates to an image reading apparatus, an image reading method, and an image reading system.

2. Related Art

An image reading apparatus is known which includes an image reading unit that reads an image of a document; a mark detection unit that stores, in advance, a plurality of combinations of marks assigned to the document, detects a mark assigned to the document from the image read by the image reading unit, and determines whether the detected mark corresponds to any of the combinations; and a job setting unit that stores, in advance, an execution pattern of at least one job, stores, in advance, the combination of the mark in association with the execution pattern, searches for the execution pattern associated with the combination of the mark detected by the mark detection unit, and sets the searched execution pattern as an execution target job (refer to JP-A-2017-092682).

SUMMARY

However, the technique in the related art is configured to detect a mark from image data which is generated by reading a document by the image reading unit, by pattern matching, optical character recognition (OCR), and the like. Therefore, advanced processing for detecting a mark from an image including the content of the document is necessary, or there is a high possibility of erroneous recognition of a mark. In addition, in the technique in the related art, the mark is detected only after reading the document by the image reading unit is executed. Therefore, in order to set conditions for reading processing including the reading of the document by the image reading unit, it is necessary for the user to operate a user interface (UI) screen or the like in advance and to perform setting, which is inconvenient for the user.

According to an aspect of the present disclosure, an image reading apparatus includes a transportation unit configured to transport a document; a reading unit configured to read the document transported by the transportation unit; a medium placement unit which is positioned upstream of the reading unit in the transportation, and on which the document and a setting sheet that includes setting information for setting a condition of reading processing of the document are placed; a detection unit which is disposed in the medium placement unit, and is configured to detect the setting information from the setting sheet placed on the medium placement unit; and a control unit configured to control the reading processing, in which the control unit sets the condition of the reading processing based on the setting information detected by the detection unit, and executes, under the condition that is set, the reading processing including reading of the document by the reading unit.

DESCRIPTION OF EXEMPLARY EMBODIMENTS

Figure 1:
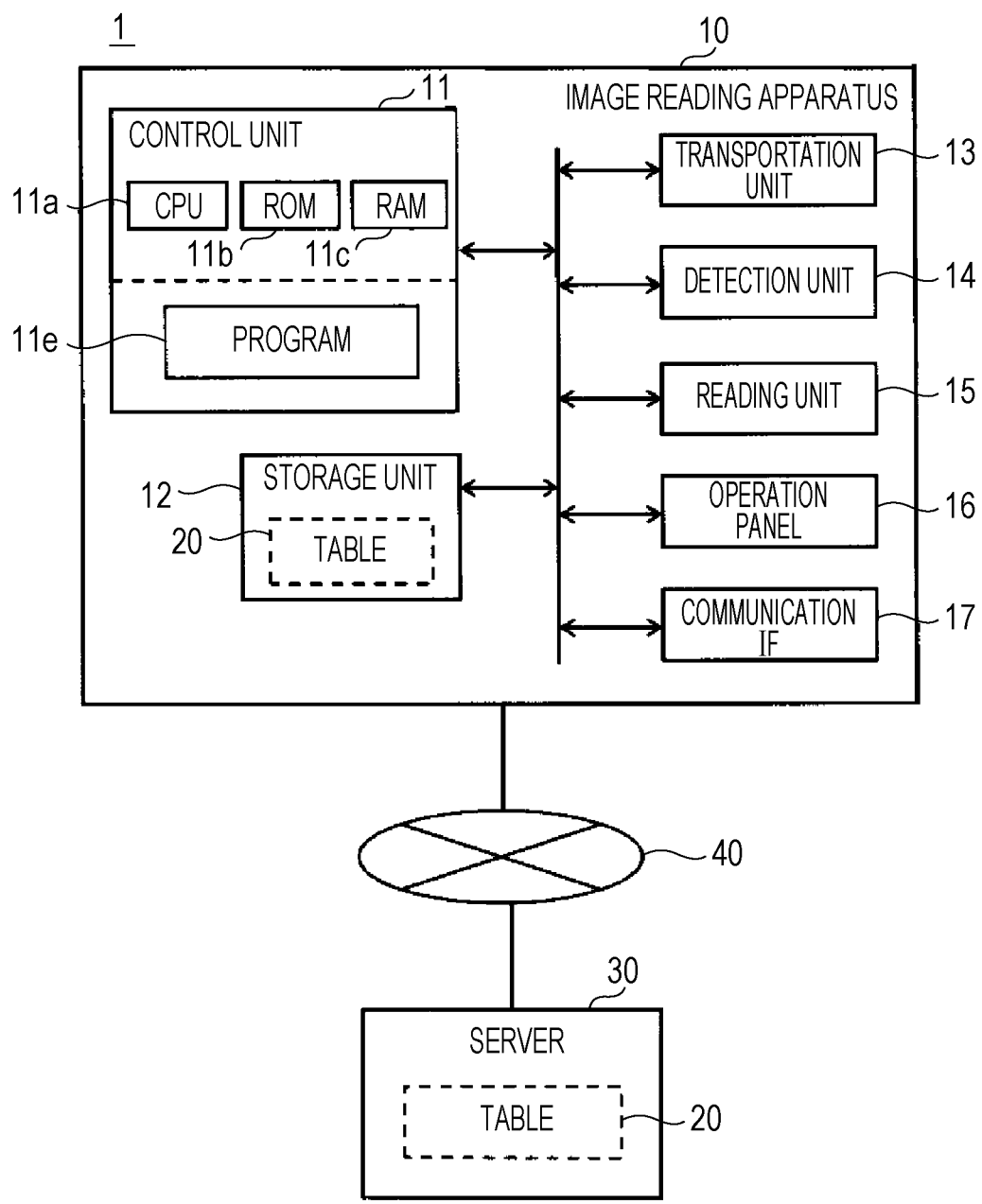
FIG. 1 is a block diagram simply illustrating a configuration of a system.

Hereinafter, an embodiment of the disclosure will be described with reference to the drawings. Each drawing is only an example for describing the embodiment. Since the drawings are examples, the shapes and ratios may not match in the drawings, or some of constituent elements may be omitted.

1. Schematic Configuration of Apparatus or the Like

FIG. 1 simply illustrates a configuration of a system 1 according to the embodiment. The system 1 includes an image reading apparatus 10 and a server 30. The system 1 may be expressed as an image reading system. The image reading apparatus 10 and the server 30 are communicably connected to each other via a network 40. The network 40 includes, for example, a local area network (LAN) or a public communication line. The server 30 is an information processing apparatus functioning as a network server.

The image reading apparatus 10 is a scanner capable of reading a document. The image reading apparatus 10 includes a control unit 11, a storage unit 12, a transportation unit 13, a detection unit 14, a reading unit 15, an operation panel 16, and a communication interface 17. The interface is abbreviated as IF. The control unit 11 includes a CPU 11a as a processor, and a memory such as a ROM 11b and a RAM 11c, for example, and controls the image reading apparatus 10 according to a program 11e stored in the memory. The control unit 11 executes, for example, a flowchart which will be described below, according to the program 11e. The processor may be configured to perform processing by a plurality of CPUs or a hardware circuit such as an application specific integrated circuit (ASIC) without being limited to one CPU, and may be configured such that the CPU and the hardware circuit perform processing in cooperation with each other.

The transportation unit 13 transports a medium from an upstream side to a downstream side in transportation. The "medium" is a concept including a document or a setting sheet 60, which will be described below, having setting information. The transportation unit 13 includes a roller for transporting a medium, a motor for rotating the roller, a driver circuit for controlling the driving of the motor, and the like.

Figure 2:
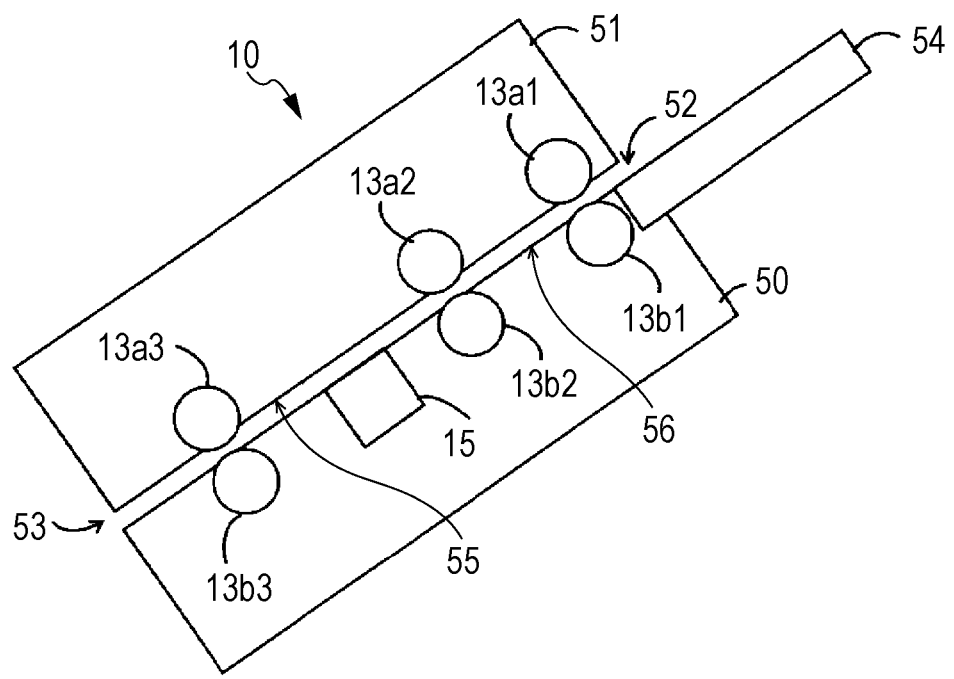
FIG. 2 is a view simply illustrating a mechanical structure of an image reading apparatus including a transportation path.

The reading unit 15 is a mechanism for optically reading a document, and includes a light source that irradiates a document, an image sensor that outputs electric charges according to an amount of the received light, an optical system for guiding light to the image sensor, and the like. The image sensor is composed of a plurality of sensor chips arranged in a first direction. The first direction is a direction intersecting a transportation direction in which the transportation unit 13 transports a medium. The term intersecting used herein means crossing at right angles, but may include a meaning including an error caused by an actual component mounting accuracy in addition to strictly crossing at right angles. That is, the reading unit 15 includes a line sensor having a length capable of covering the width of a document in the first direction. In FIG. 2 which will be described below, the first direction is a direction perpendicular to the paper surface of FIG. 2.

The document transported by the transportation unit 13 is read by the reading unit 15. Therefore, the image reading apparatus 10 corresponds to a sheet-feed scanner. At least a part of the transportation unit 13 may be referred to as an auto document feeder (ADF). The operation panel 16 includes a display unit for displaying visual information, an operation reception unit for receiving an operation from a user, and the like. The operation reception unit is a touch panel realized in the display unit, a physical button, or the like. The communication IF 17 is a general term for one or a plurality of IFs for executing communication of the image reading apparatus 10 with the outside in a wired or wireless manner conforming to a predetermined communication protocol including a known communication standard.

The storage unit 12 is constituted by a memory and other storage mediums. The storage unit 12 may be a part of the control unit 11. The storage unit 12 stores a table 20 in which a correspondence relationship between setting information for setting conditions of reading processing and the conditions of the reading processing is prescribed. However, the table 20 may be stored outside the image reading apparatus 10. That is, as illustrated in FIG. 1, the table 20 may be stored in either the image reading apparatus 10 or the server 30.

The detection unit 14 is one or more sensors disposed in a medium placement unit 54 of the image reading apparatus 10. The detection unit 14 can detect setting information from the setting sheet 60, and outputs the detected setting information to the control unit 11.

The image reading apparatus 10 may be a multifunction machine having multiple functions such as a printing function, a facsimile communication function, and an email sending function, in addition to the function as the scanner.

FIG. 2 simply illustrates a mechanical structure of the image reading apparatus 10 including a transportation path 55. As illustrated in FIG. 2, the image reading apparatus 10 includes a main body unit 50, and a cover 51 that covers an upper surface 56 of the main body unit 50. The cover 51 can be opened or closed with respect to the main body unit 50. The transportation path 55 of the medium by the transportation unit 13 is ensured between the main body unit 50 and the cover 51. That is, the transportation unit 13 introduces the medium into a housing of the image reading apparatus 10 through a supply port 52 on the upstream side of the transportation path 55. In addition, the transportation unit 13 discharges the medium to the outside through a discharge port 53 on the downstream side of the transportation path 55.

The medium placement unit 54 for the placement of the document or the setting sheet 60 is formed in the vicinity of the supply port 52. The medium placement unit 54 extends further to the upstream side of the supply port 52, and has a size capable of supporting the entire surface or the approximately entire surface of a medium having a predetermined size. That is, the medium placement unit 54 has a function of causing the upper surface 56 of the main body unit 50 to extend to the upstream side. The medium placement unit 54 may be referred to as a medium supporting unit, a medium tray, and the like. The user can place a bunch of mediums on the medium placement unit 54. The medium placement unit 54 may be a separate member from the main body unit 50, or may be a part integrally formed with the main body unit 50.

The reading unit 15 is housed in the main body unit 50. The reading unit 15 reads a first surface, which faces the upper surface 56 of the main body unit 50, of the document transported along the transportation path 55 by the transportation unit 13. The image reading apparatus 10 may further include a reading unit at a position capable of reading a second surface, which faces the cover 51, of the document transported along the transportation path 55 by the transportation unit 13. That is, the image reading apparatus 10 may be a scanner capable of simultaneously reading the first surface and the second surface of the document.

In FIG. 2, rollers 13$a$1 and 13$b$1, rollers 13$a$2 and 13$b$2, and rollers 13$a$3 and 13$b$3, which respectively constitute a pair and face each other across the transportation path 55, are illustrated as the rollers constituting the transportation unit 13. The rollers 13$a$1, 13$a$2, and 13$a$3 are disposed on the cover 51, and the rollers 13$b$1, 13$b$2, and 13$b$3 are disposed on the main body unit 50. Among the three pairs of rollers, the pair of rollers 13$a$1 and 13$b$1 on the most upstream side is disposed at a position on the slightly downstream side of the supply port 52. The rollers 13$a$1 and 13$b$1 are rollers which transport the mediums placed on the medium placement unit 54 to the downstream side from the medium close to the medium placement unit 54 in order, and the rollers 13$a$1 and 13$b$1 are referred to as "paper feeding rollers 13$a$1 and 13$b$1".

The pair of rollers 13$a$2 and 13$b$2, which is disposed on the downstream side of the paper feeding rollers 13$a$1 and 13$b$1 and the upstream side of the reading unit 15, transports the medium transported by the paper feeding rollers 13$a$1 and 13$b$1 to the further downstream side. Since the document transported by the rollers 13$a$2 and 13$b$2 is read by the reading unit 15 when passing through a position of the reading unit 15 on the transportation path 55, the rollers 13$a$2 and 13$b$2 are referred to as "reading transportation rollers 13$a$2 and 13$b$2". Among the three pairs of rollers, the pair of rollers 13$a$3 and 13$b$3 on the most downstream side is disposed on the downstream side of the reading unit 15. The rollers 13$a$3 and 13$b$3 transport the medium transported by the reading transportation rollers 13$a$2 and 13$b$2 to the further downstream side to discharge the medium to the outside through the discharge port 53. Accordingly, the rollers 13$a$3 and 13$b$3 are referred to as "discharge rollers 13$a$3 and 13$b$3".

Figure 3:
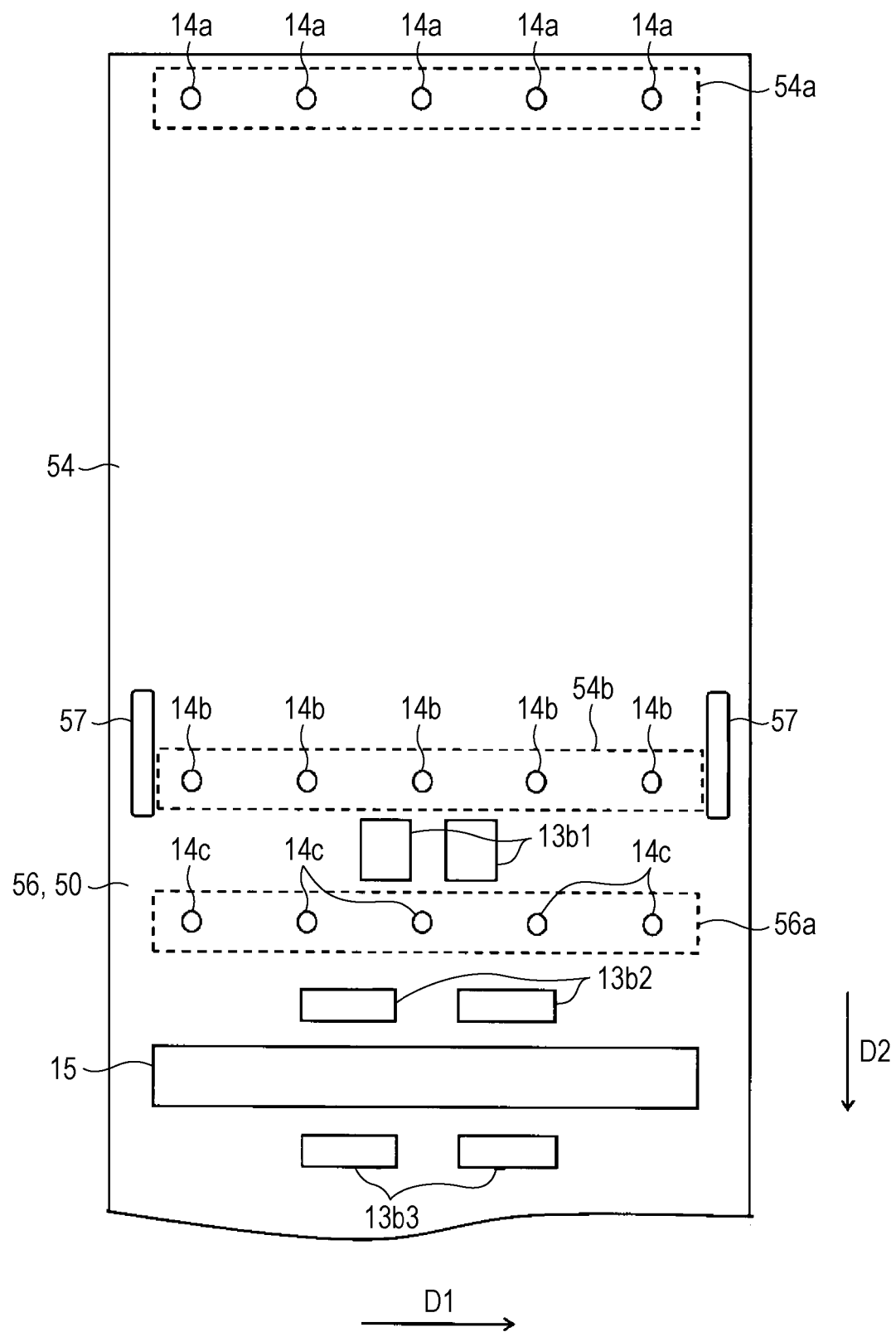
FIG. 3 is a view illustrating a range including a medium placement unit and a part of a main body unit from a viewpoint of facing an upper surface.

FIG. 3 illustrates a range including the medium placement unit 54 and a part of the main body unit 50 from a viewpoint of facing the upper surface 56. The reference numeral D1 indicates the first direction, and the reference numeral D2 indicates the transportation direction. The first direction D1 may be referred to as a main scanning direction of the image sensor or may be referred to as a width direction of the medium. As illustrated in FIG. 3, a plurality of first sensors 14a are disposed in a first region 54a in the vicinity of an upstream end portion of the medium placement unit 54. In the example of FIG. 3, in the first region 54a, five first sensors 14a are provided at regular intervals along the first direction D1. In addition, a plurality of second sensors 14b are disposed in a second region 54b on the downstream side of the first region 54a in the medium placement unit 54. Specifically, the second region 54b is present at a position on the slightly upstream side of the paper feeding rollers 13a1 and 13b1. As a matter of course, in FIG. 3, among the pairs of rollers described above, the rollers 13b1, 13b2, and 13b3 included in the main body unit 50 are illustrated. In the example of FIG. 3, similarly to the first sensors 14a in the first region 54a, in the second region 54b, five second sensors 14b are provided at regular intervals along the first direction D1.

Each of the first sensors 14a and the second sensors 14b is a reflective sensor having a light emission unit and a light reception unit, and the light reception unit outputs a detection signal corresponding to a state of a detection target. When the user places the medium on the medium placement unit 54, a leading end of the medium comes into contact with the paper feeding rollers 13a1 and 13b1. An end of the medium, which faces the downstream side of the transportation direction D2 is referred to as a "leading end", and an end of the medium, which faces the upstream side of the transportation direction D2 is referred to as a "trailing end". When a medium having the predetermined size placed on the medium placement unit 54 is assumed, the first sensor 14a faces a region in the vicinity of the trailing end of the medium, and the second sensor 14b faces a region in the vicinity of the leading end of the medium.

A plurality of third sensors 14c are disposed in a third region 56a on the downstream side of the second region 54b. Specifically, the third region 56a is positioned between the paper feeding rollers 13a1 and 13b1 and the reading transportation rollers 13a2 and 13b2. In the example of FIG. 3, similarly to the first sensors 14a and the second sensors 14b, in the third region 56a, five third sensors 14c are provided at regular intervals along the first direction D1.

Each of the third sensors 14c is a transmissive sensor having a light emission unit and a light reception unit, and the light reception unit outputs a detection signal corresponding to a state of a detection target. Therefore, although not illustrated, light reception units and the light emission units as the third sensors 14c are separately disposed in the third region 56a of the main body unit 50, and a region of the cover 51, which faces the third region 56a. However, the third sensors 14c may be a reflective sensor same as the first sensors 14a and the second sensors 14b.

When the medium placement unit 54 is defined as a region where the medium before transportation by the transportation unit 13 is placed, a region on the upstream side of the paper feeding rollers 13a1 and 13b1 corresponds to the medium placement unit 54. Therefore, the first sensors 14a and the second sensors 14b correspond to the detection unit 14 disposed in the medium placement unit 54. On the other hand, when the medium placement unit 54 is widely defined as a region on the upstream side of a position where reading can be performed by the reading unit 15, a region on the upstream side of the reading transportation rollers 13a2 and 13b2 can be referred to as the medium placement unit 54. When the medium placement unit 54 is widely defined, in addition to the first sensors 14a and the second sensors 14b, the third sensors 14c also correspond to the detection unit 14 disposed in the medium placement unit 54.

The medium placement unit 54 includes edge guides 57 as a wall member protruding from the surface of the medium placement unit 54. The edge guides 57 are two pieces of the wall member that are separated from each other in the first direction D1, and regulate the position of the medium placed on the medium placement unit 54 in the first direction D1 from both sides of the medium. As is known, the user can change a distance between the edge guides 57 by sliding the edge guides 57 in a direction parallel with the first direction D1. FIG. 3 illustrates a state of the longest distance between the edge guides 57. In addition, according to FIG. 3, all of the first region 54a, the second region 54b, and the third region 56a are regions present between the edge guides 57 in the state of the longest distance, in the first direction D1. Therefore, it can be said that the first sensors 14a, the second sensors 14b, and the third sensor 14c are disposed on the upstream side of the rollers of the transportation unit 13 in the transportation and between the edge guides 57.

The image reading apparatus 10 is not limited to a configuration including all of the first sensors 14a, the second sensors 14b, and the third sensors 14c. The image reading apparatus 10 may have, for example, a configuration which includes the first sensors 14a and the second sensors 14b and does not includes the third sensors 14c. Alternatively, the image reading apparatus 10 may have a configuration including either the first sensors 14a or the second sensors 14b, and the third sensors 14c. Alternatively, the image reading apparatus 10 may have a configuration which includes either the first sensors 14a or the second sensors 14b and does not includes the third sensors 14c.

2. Description of Setting Sheet

Figure 4A:
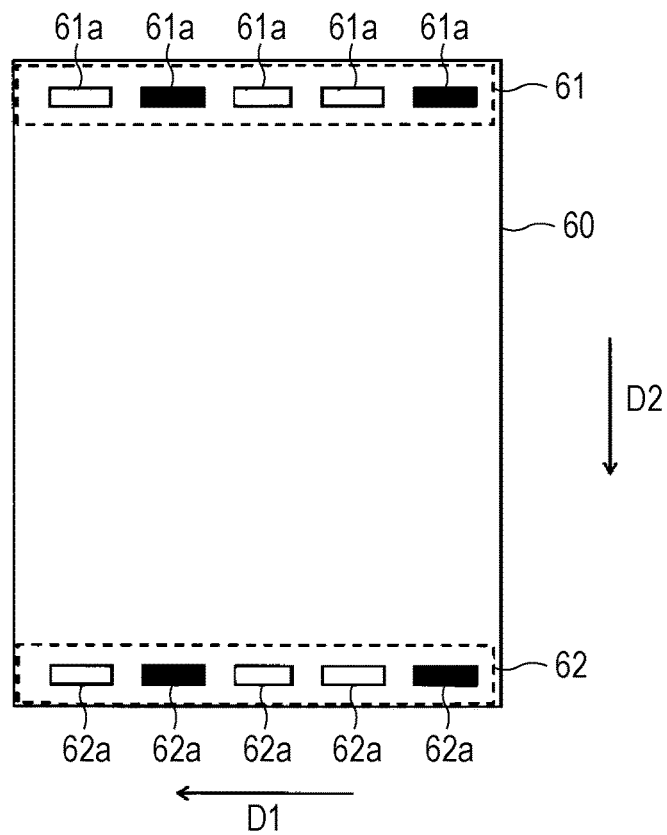
FIG. 4A is a view illustrating an example of a setting sheet.

FIG. 4A illustrates an example of the setting sheet 60. In FIG. 4A, a relationship of the setting sheet 60 and the directions D1 and D2 is also illustrated. The setting sheet 60 is, for example, a paper sheet having the predetermined size. As illustrated in FIG. 4A, a plurality of setting frames 62a are provided in a leading end region 62 which is a region in the vicinity of the leading end of the setting sheet 60. The position and number of setting frames 62a in the leading end region 62 correspond to the position and number that can be detected by the second sensors 14b in the second region 54b when the setting sheet 60 is placed on the medium placement unit 54. That is, since, in the example of FIG. 3, the five second sensors 14b are provided in the second region 54b at regular intervals along the first direction D1, accordingly, in FIG. 4A, five setting frames 62a are provided in the leading end region 62 at regular intervals along the first direction D1.

Similarly to the setting frames 62a in the leading end region 62, a plurality of setting frames 61a are provided in a trailing end region 61 which is a region in the vicinity of the trailing end of the setting sheet 60. The position and number of setting frames 61a in the trailing end region 61 correspond to the position and number that can be detected by the first sensors 14a in the first region 54a when the setting sheet 60 is placed on the medium placement unit 54.

Each of the setting frames 61a and 62a is either a blank frame or a frame painted, for example, black. The setting sheet 60 is placed on the medium placement unit 54 such that a surface of the setting sheet 60 where the setting frames are provided faces the medium placement unit 54. Each of the sensors 14a and 14b outputs either a detection signal (for example, "0") indicating that the setting frame as the detection target is a blank frame or a detection signal (for example, "1") indicating that the setting frame is a painted frame. Therefore, when the number of setting frames 61a included in the trailing end region 61 is N, it is possible to express setting information of 2 to the power of N at the maximum, by the trailing end region 61. Similarly, when the number of setting frames 62a is N, it is possible to express setting information of 2 to the power of N at the maximum, by the leading end region 62.

In the table 20, a correspondence relationship between a plurality of pieces of setting information and conditions of reading processing is prescribed. In the embodiment, the term "reading processing" refers to a series of processing including transporting the document placed on the medium placement unit 54 from the transportation start to the discharge completion by the transportation unit 13; reading the transported document by the reading unit 15; processing of storing a result of reading the document by the reading unit 15, that is, read data output as a result of photoelectric conversion, in a storage destination; and the like. Therefore, conditions that can be set for the reading processing include, for example, a transportation speed by the transportation unit 13, enabling/disabling a double feeding detection mode for detecting presence/absence of double feeding of the document based on the load applied to the rollers, enabling/disabling a separation mode for separating and transporting the document one by one, and the like. Further, the conditions that can be set for the reading processing include, for example, a color mode/monochrome mode of the reading by the reading unit 15, a storage destination of the read data, and the like.

The setting sheet 60 is a sheet in which the setting frame described above is arbitrarily painted by the user, for example. Alternatively, the setting sheet 60 in which several setting frames are painted according to the conditions of the reading processing may be provided to the user for a fee or free of charge by a vendor of the image reading apparatus 10 or the like. For example, the user can access the website of the vendor, arbitrarily select the setting sheet 60 from among a plurality of setting sheets 60 in which the setting frames are painted in various patterns according to the conditions of the reading processing, and print the selected setting sheet 60.

The setting sheet 60 is not limited to the configuration in which the setting frames are provided in each of the leading end region 62 and the trailing end region 61 as described above. The setting sheet 60 may have a configuration in which the setting frames are provided in either the leading end region 62 or the trailing end region 61.

Figure 4B:
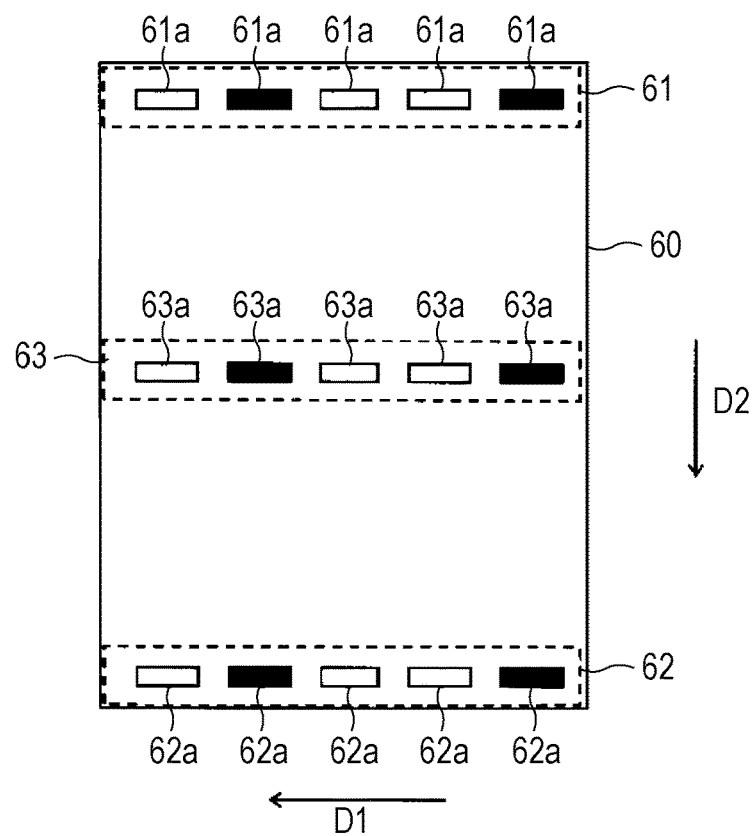
FIG. 4B is a view illustrating another example of the setting sheet.

FIG. 4B illustrates an example of the setting sheet 60 different from that of FIG. 4A. The setting sheet 60 of FIG. 4B is different from the setting sheet 60 of FIG. 4A in that a plurality of setting frames 63a are provided. As illustrated in FIG. 4B, the plurality of setting frames 63a are provided in a central region 63 which is a region at the center or in the vicinity of the center of the setting sheet 60. The position and number of setting frames 63a in the central region 63 correspond to the position and number that can be detected by the third sensors 14c in the third region 56a when the central region 63 passes through the third region 56a by the setting sheet 60 being transported from the medium placement unit 54. Each of the third sensors 14c which are the reflective sensors outputs either a detection signal (for example, "0") indicating that the setting frame 63a as the detection target is a blank frame or a detection signal (for example, "1") indicating that the setting frame 63a is a painted frame. Therefore, when the number of setting frames 63a included in the central region 63 is N, it is possible to express setting information of 2 to the power of N at the maximum, by the central region 63. Even in a configuration in which the setting frames 63a are provided in the central region 63 as illustrated in FIG. 4B, the setting sheet 60 may have a configuration in which the setting frames are provided in either the leading end region 62 or the trailing end region 61.

The setting sheet 60 is not limited to a so-called mark sheet type sheet as described above. The setting sheet 60 may be a cut-out type sheet in which an inside of the setting frame can be cut out. In this case, the setting frame of the setting sheet 60 is either a state of not being cut out or a state of being cut out, that is, a through-hole. When the setting sheet 60 is such a cut-out type sheet, the setting frame in a state of being cut out may be regarded equivalently as the painted setting frame in the setting sheet 60 of a mark sheet type. That is, when the setting sheet 60 is a cut-out type sheet, each sensor as the detection unit 14 outputs either a detection signal (for example, "0") indicating that the setting frame as the detection target is a non-cut-out frame or a detection signal (for example, "1") indicating that the setting frame is a cut-out frame.

The setting frame in the setting sheet 60 of the cut-out type is detected using a transmissive sensor. In the example of FIG. 3, among the first sensors 14a in the first region 54a, the second sensors 14b in the second region 54b, and the third sensors 14c in the third region 56a, a transmissive sensor can be adopted for the third sensors 14c. Therefore, as one specific example, a transmissive sensor is adopted for the third sensor 14c, and in the setting sheet 60 illustrated in FIG. 4B, the setting frames 63a of the central region 63 can be cut-out type setting frames instead of being mark sheet type setting frames.

As described above, the setting sheet 60 having a plurality of setting frames each of which is painted or not painted, or a plurality of setting frames each of which is cut out or not cut out, is the setting sheet 60 having setting information. The shape of the setting frame is not limited to the rectangle as illustrated in FIGS. 4A and 4B, and may be a circle or an ellipse.

3. Condition Setting and Reading Processing using Setting Sheet

Next, several examples regarding the reading processing and condition setting for the reading processing using the setting sheet 60 will be described.

FIRST EXAMPLE

Figure 5:
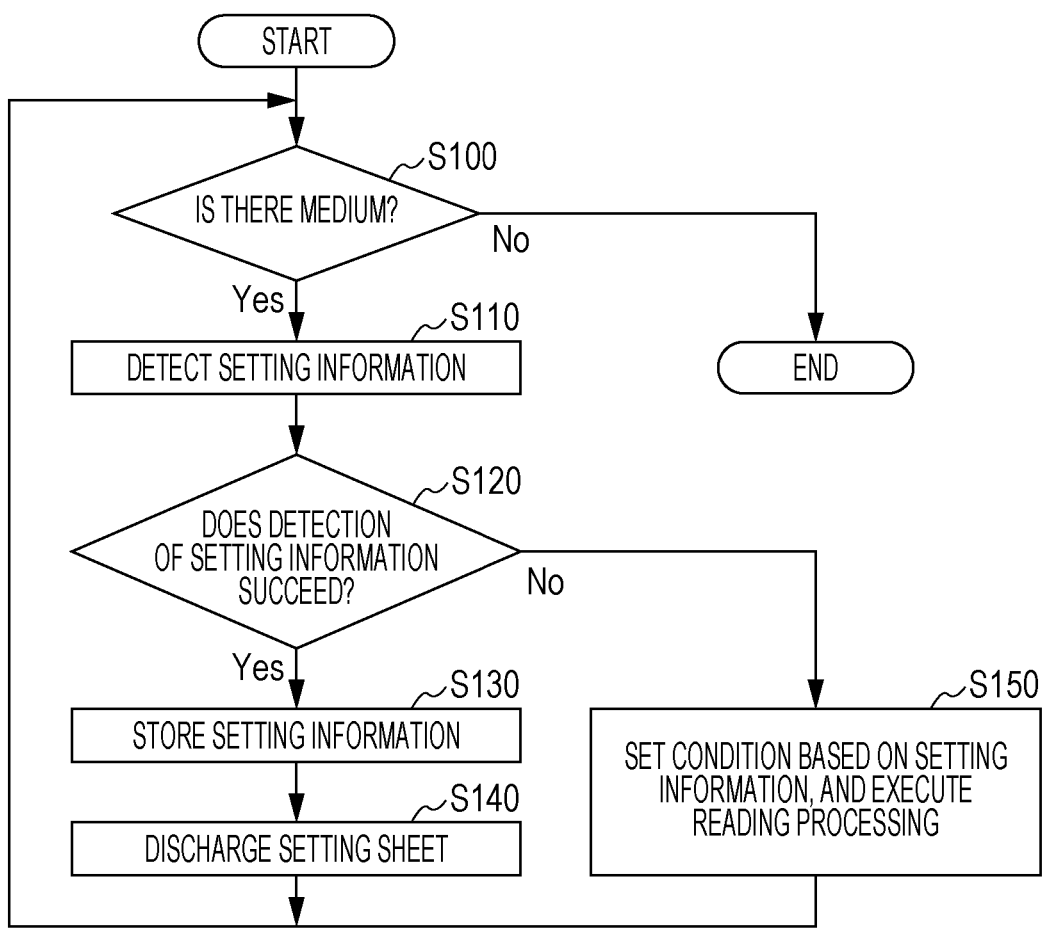
FIG. 5 is a flowchart illustrating a first example.

FIG. 5 illustrates image reading processing according to a first example in a flowchart. Each of FIGS. 5, 6, and 7 discloses an image reading method.

The user places a bunch of mediums consisting of the setting sheet 60 and the document on the medium placement unit 54. At this time, the user places the bunch of mediums on the medium placement unit 54 so that the setting sheet 60 is lowermost, that is, the setting sheet 60 is placed directly on the medium placement unit 54. The user may place a bunch of mediums in a state where, in addition to the lowermost setting sheet 60, another setting sheet 60 is disposed between the documents, on the medium placement unit 54.

In the first example, a setting sheet 60 having setting frames in any of the leading end region 62, the trailing end region 61, and the central region 63 is assumed. More specifically, the setting sheet 60 having the plurality of setting frames 62a in the leading end region 62 is assumed here. In addition, the image reading apparatus 10 having the detection unit 14 which can detect the setting information from such a setting sheet 60 having the plurality of setting frames 62a in the leading end region 62, that is, the image reading apparatus 10 having the plurality of second sensors 14b in the second region 54b is assumed.

The control unit 11 starts the flowchart in the drawing when receiving an instruction to start scanning from the user via the operation panel 16.

In step S100, the control unit 11 determines whether a medium is placed on the medium placement unit 54. When the medium is placed on the medium placement unit 54, the control unit 11 proceeds to step S110 after the determination of "Yes" in step S100. On the other hand, when the medium is not placed on the medium placement unit 54, the control unit 11 ends the flowchart after the determination of "No" in step S100.

It is sufficient in step S100 that the control unit 11 can determine whether a medium is placed on the medium placement unit 54. For example, the control unit 11 determines whether a medium is placed on the medium placement unit 54 based on the detection signals output from the plurality of second sensors 14b. Alternatively, the control unit 11 may determine whether a medium is placed on the medium placement unit 54 based on the detection signal from a sensor (not illustrated) which is different from the detection unit 14 and can detect the presence or absence of the medium on the medium placement unit 54.

In step S110, the control unit 11 detects setting information. That is, the control unit 11 acquires a detection signal output from each second sensor 14b in the second region 54b. The information detected in step S110 is called setting information for the convenience of description, but at the time point in step S110, it is not known whether the information is actually setting information.

In step S120, the control unit 11 determines whether the detection of the setting information in step S110 has succeeded. That is, the control unit 11 determines whether the information expressed by the detection signal acquired from each second sensor 14b in step S110 corresponds to legitimate setting information obtained by detecting the plurality of setting frames 62a of the setting sheet 60. For example, the detection signal output from each of N second sensors 14b as described above is a binary signal of "0" or "1", and several combinations of N binary signals corresponding to legitimate setting information are determined in advance.

Therefore, when the combination of "0" and "1" expressed by the detection signal acquired from each second sensor 14b in step S110 corresponds to any combination of binary signals corresponding to the legitimate setting information, the control unit 11 determines that the detection of the setting information has succeeded ("Yes" in step S120), and proceeds to step S130. On the other hand, when the combination of "0" and "1" expressed by the detection signal acquired from each second sensor 14b in step S110 does not correspond to any combination of binary signals corresponding to the legitimate setting information, the control unit 11 determines that the detection of the setting information has failed ("No" in step S120), and proceeds to step S150.

That the detection of the setting information has succeeded means that the current detection target by each second sensor 14b as the detection unit 14 is the setting sheet 60. Meanwhile, that the detection of the setting information has failed means that the current detection target by each second sensor 14b as the detection unit 14 is the document.

A determination method, which will be described below using FIGS. 8A to 8C, or the like can be applied to the determination in step S120.

In step S130, the control unit 11 stores the information expressed by the detection signal acquired from each second sensor 14b in step S110, that is, the setting information, in the storage unit 12 or a predetermined memory other than the storage unit 12. When the setting information that has been stored in previous step S130 is present at the time of executing step S130, the control unit 11 overwrites the setting information that has been stored, with setting information to be stored in current step S130.

In step S140, the control unit 11 controls the transportation unit 13 to discharge the medium placed on the medium placement unit 54, that is, the setting sheet 60. Step S140 is an operation of discharging the medium at the predetermined transportation speed, and the reading of the medium by the reading unit 15 is not executed. The transportation unit 13 starts the transportation of the setting sheet 60 which is currently the lowermost medium among the mediums displaced on the medium placement unit 54, and discharges the setting sheet 60 to the outside of the image reading apparatus 10 through the discharge port 53. After step S140, the control unit 11 performs again the determination of step S100. When the trailing end of the setting sheet 60 has passed through, for example, the paper feeding rollers 13a1 and 13b1 after the start of the discharge of the setting sheet 60 in step S140, the control unit 11 may start again the determination of step S100 before the discharge of the setting sheet 60 is completed.

In step S150, the control unit 11 sets the conditions of the reading processing based on the setting information stored in step S130, and executes the reading processing under the set conditions. In this case, the control unit 11 reads the prescribed conditions of the reading processing corresponding to the setting information stored in step S130, from the table 20, and sets the read conditions. As described above, the table 20 is stored in the storage unit 12 or the server 30. The conditions of the reading processing to be set here are, for example, the conditions relating to the transportation by the transportation unit 13 as described above, the conditions relating to the reading by the reading unit 15, the storage destination of the read data, and the like. In step S150, the control unit 11 controls the transportation unit 13 and the reading unit 15 under the set conditions to execute the reading processing by medium (document) units.

After step S150, the control unit 11 performs again the determination of step S100. Until "No" is determined in step S100, the control unit 11 updates the storage of the setting information in step S130 whenever "Yes" is determined in step S120, that is, whenever the detection target by the detection unit 14 is the setting sheet 60. Meanwhile, while the determination of "No" is repeated in step S120, that is, while a cycle of steps S100, S110, S120, S150, and S100 is repeated, the reading processing is repeatedly executed by document units, under the conditions based on the setting information stored in most recent step S130. In step S150, when the conditions of the reading processing corresponding to the setting information stored in most recent step S130 are the same as currently set conditions, the control unit 11 may execute the reading processing under the currently set conditions.

whenever the reading processing in document units in step S150 is performed, the control unit 11 may store the generated read data in document units, in the storage destination set as one condition of the reading processing. Note that, in step S150, the control unit 11 may temporarily store the read data in document units in the predetermined memory in association with storage destination information that specifies the storage destination. The storage destination information is a kind of reading processing condition defined in the table 20 corresponding to the setting information. The storage destination information indicates, for example, a specific folder in the storage unit 12, an address of the server 30, an address of a PC (not illustrated), and the like. At a timing where "No" is determined in step S100, that is, at a timing where the medium placement unit 54 has run out of the medium, the control unit 11 may store the temporarily stored read data at the storage destination indicated by the associated storage destination information.

SECOND EXAMPLE

Figure 6:
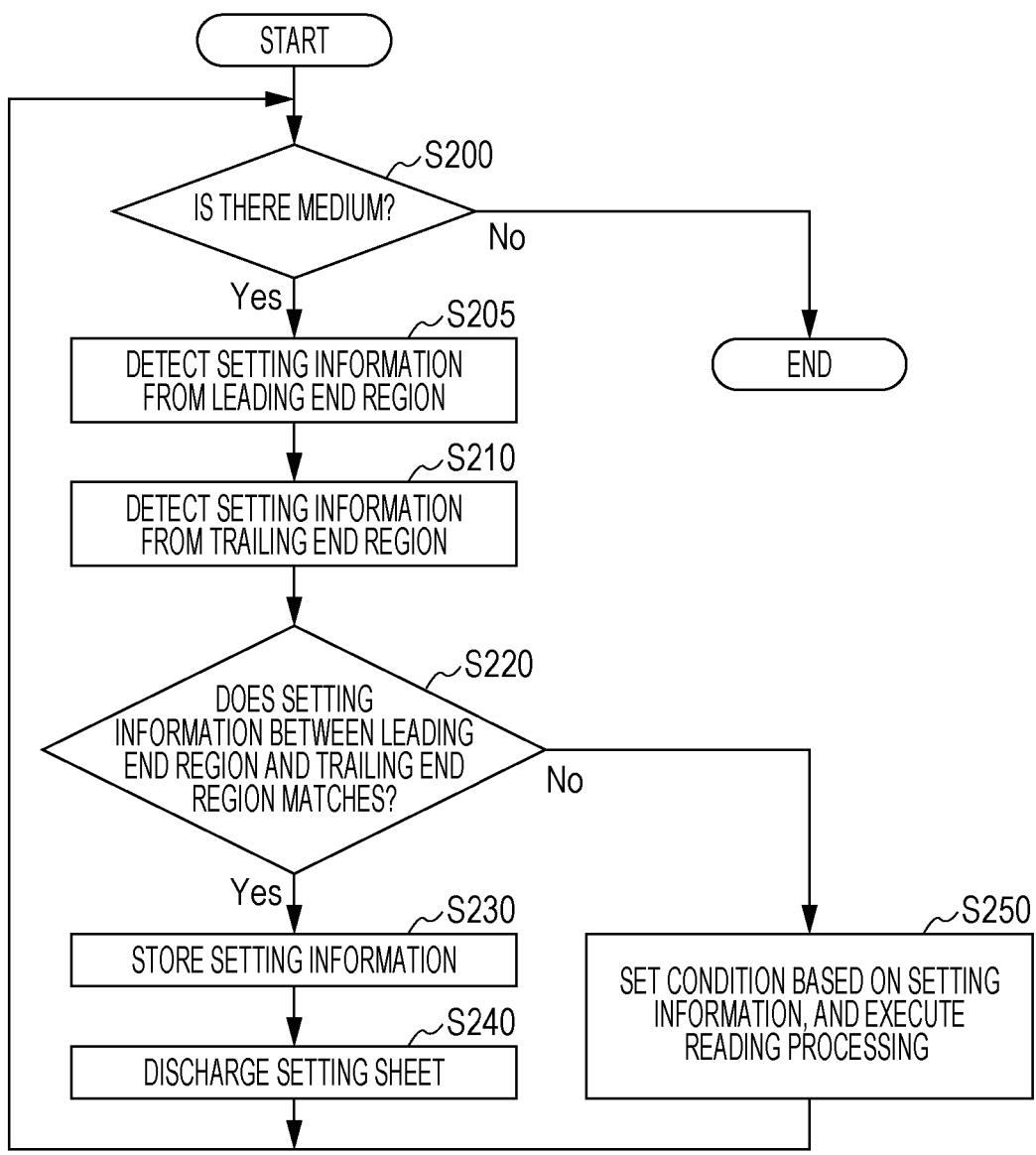
FIG. 6 is a flowchart illustrating a second example.

FIG. 6 illustrates image reading processing according to a second example in a flowchart. Regarding the second example, the same description as the first example will be omitted. In the second example, a setting sheet 60 having setting frames in both the leading end region 62 and the trailing end region 61 is assumed. In addition, the image reading apparatus 10 having the detection unit 14 which can detect the setting information from such a setting sheet 60, that is, the image reading apparatus 10 having the plurality of first sensors 14a in the first region 54a and the plurality of second sensors 14b in the second region 54b is assumed.

As a premise of the second example, in the setting sheet 60, the setting information expressed by the plurality of setting frames 62a in the leading end region 62 and the setting information expressed by the plurality of setting frames 61a in the trailing end region 61 are the same as each other. That is, as illustrated in FIG. 4A, a pattern in which the setting frames 62a that are painted and the setting frames 62a that are not painted are arranged in the leading end region 62 and a pattern in which the setting frames 61a that are painted and the setting frames 61a that are not painted are arranged in the trailing end region 61 are the same as each other.

Step S200 is the same processing as step S100.

In step S205, the control unit 11 detects setting information from the leading end region of the medium. That is, the control unit 11 acquires a detection signal output from each second sensor 14b in the second region 54b. The information detected in step S205 is called setting information for the convenience of description, but at the time point in step S205, it is not known whether the information is actually setting information.

In step S210, the control unit 11 detects setting information from the trailing end region of the medium. That is, the control unit 11 acquires a detection signal output from each first sensor 14a in the first region 54a. The information detected in step S210 is called setting information for the convenience of description, but at the time point in step S210, it is not known whether the information is actually setting information.

Step S205 and step S210 may be performed in a reverse order, or may be performed in parallel.

In step S220, the control unit 11 determines whether the setting information detected from the leading end region of the medium in step S205 and the setting information detected from the trailing end region of the medium in step S210 match each other. Even in the document, characters, patterns, and the like may be printed in the leading end region and the trailing end region. In addition, there is a document in which a hole is formed in an end portion such as a so-called loose-leaf type. Therefore, in order to avoid that the information detected from the document by the detection unit 14 is erroneously recognized as setting information, the determination of step S220 is performed. Step S120 in the first example is also a kind of determination for avoiding such erroneous recognition.

When the information detected from the leading end region of the medium and the information detected from the trailing end region of the medium match each other, the information is highly likely to be information obtained from the setting sheet 60, that is, the setting information. On the other hand, when the information detected from the leading end region of the medium and the information detected from the trailing end region of the medium are different from each other, the information is highly likely to be information obtained from the document. Therefore, when the setting information detected from the leading end region of the medium in step S205 and the setting information detected from the trailing end region of the medium in step S210 match each other, the control unit 11 proceeds to step S230 after the determination of "Yes" in step S220. Meanwhile, when the setting information detected from the leading end region of the medium in step S205 does not match the setting information detected from the trailing end region of the medium in step S210, since the information is highly likely not to be setting information actually, the control unit 11 proceeds to step S250 after the determination of "No" in step S220.

Step S230 is the same processing as step S130. That is, the control unit 11 stores the setting information expressed by the detection signal acquired from each second sensor 14b in step S205, or the setting information expressed by the detection signal acquired from each first sensor 14a in step S210, in the storage unit 12 or a predetermined memory other than the storage unit 12. When the setting information that has been stored in previous step S230 is present at the time of executing step S230, the control unit 11 overwrites the setting information that has been stored, with setting information to be stored in current step S230.

Step S240 is the same processing as step S140. After step S240, the control unit 11 performs again the determination of step S200. The flow of determining "No" in step S220 and executing step S250 is the same as the flow of determining "No" in step S120 and executing step S150. That is, in step S250, the control unit 11 sets the conditions of the reading processing based on the setting information stored in step S230, and executes the reading processing under the set conditions. After step S250, the control unit 11 performs again the determination of step S200.

THIRD EXAMPLE

Figure 7:
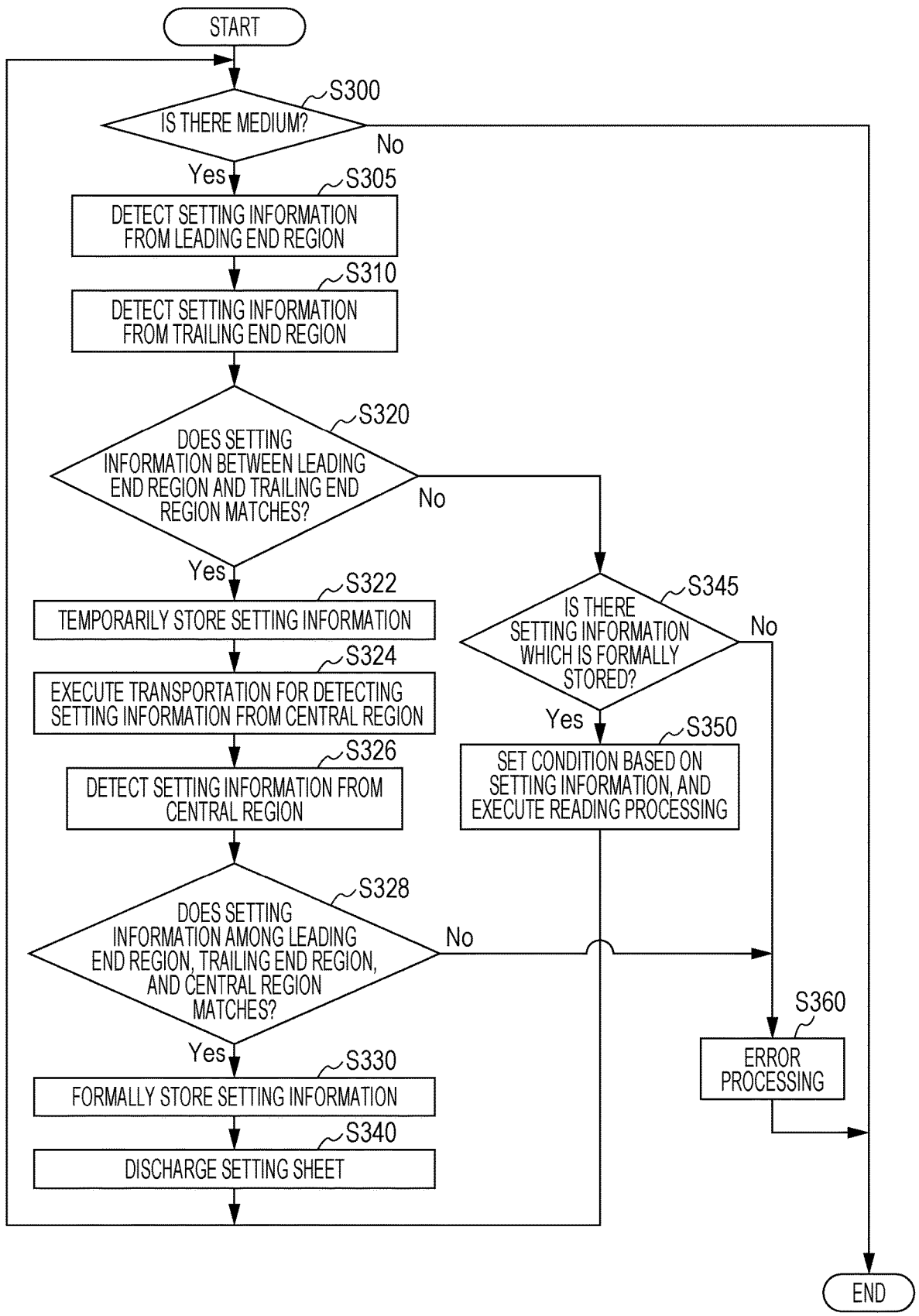
FIG. 7 is a flowchart illustrating a third example.

FIG. 7 illustrates image reading processing according to a third example in a flowchart. Regarding the third example, the same description as the first example or the second example will be omitted. In the third example, a setting sheet 60 having setting frames in the leading end region 62, the trailing end region 61, and the central region 63 is assumed. In addition, the image reading apparatus 10 having the detection unit 14 which can detect the setting information from such a setting sheet 60, that is, the image reading apparatus 10 having the plurality of first sensors 14a in the first region 54a, the plurality of second sensors 14b in the second region 54b, and the plurality of third sensors 14c in the third region 56a is assumed.

As a premise of the third example, in the setting sheet 60, the setting information expressed by the plurality of setting frames 62a in the leading end region 62, the setting information expressed by the plurality of setting frames 61a in the trailing end region 61, and the setting information expressed by the plurality of setting frames 63a in the central region 63 are the same as each other. That is, as illustrated in FIG. 4B, a pattern in which the setting frames 62a that are painted and the setting frames 62a that are not painted are arranged in the leading end region 62, a pattern in which the setting frames 61a that are painted and the setting frames 61a that are not painted are arranged in the trailing end region 61, and a pattern in which the setting frames 63a that are painted and the setting frames 63a that are not painted (alternatively, the setting frames 63a that are cut out and the setting frames 63a that are not cut out) are arranged in the central region 63 are the same as each other.

Steps S300, S305, S310, and S320 are the same processing as steps S200, S205, S210, and S220. The control unit 11 proceeds to step S322 after the determination of "Yes" in step S320. Meanwhile, the control unit 11 proceeds to step S345 after the determination of "No" in step S320.

In step S322, the control unit 11 temporarily stores the setting information expressed by the detection signal acquired from each second sensor 14b in step S305, or the setting information expressed by the detection signal acquired from each first sensor 14a in step S310, in the storage unit 12 or a predetermined memory other than the storage unit 12. The storing of the setting information in step S322 may be expressed as temporary storage.

In step S324, the control unit 11 causes the transportation unit 13 to execute transportation required for detecting the setting information from the central region 63 of the setting sheet 60. Since the position of the central region 63 in the setting sheet 60 is determined in advance, a transportation distance required for transporting the central region 63 of the setting sheet 60 placed on the medium placement unit 54 to the third region 56a is determined. More specifically, the transportation distance is a transportation distance required for causing each setting frame 63a in the central region 63 of the setting sheet 60 placed on the medium placement unit 54 to face each third sensor 14c in the third region 56a. The control unit 11 instructs the transportation unit 13 to perform transportation for the transportation distance. In this manner, the transportation unit 13 transports the lowermost medium among the mediums placed on the medium placement unit 54 to the position where the central region of the corresponding medium faces the third region 56a.

In step S326, the control unit 11 detects setting information from the central region of the medium. That is, the control unit 11 acquires the detection signal output from each third sensor 14c in the third region 56a. The information detected in step S326 is called setting information for the convenience of description, but at the time point in step S326, it is not known whether the information is actually setting information.

In step S328, the control unit 11 determines whether the setting information detected from the leading end region of the medium in step S305, the setting information detected from the trailing end region of the medium in step S310, and the setting information detected from the central region of the medium in step S326 match each other. Here, it is sufficient that the control unit 11 compares the setting information temporarily stored in step S322 with the setting information detected from the central region of the medium in step S326. When the pieces of information compared in step S328 match each other, the control unit 11 proceeds to step S330 after the determination of "Yes", and when the pieces of information compared in step S328 do not match each other, the control unit 11 proceeds to step S360 after the determination of "No".

In the third example, when the information detected from the leading end region of the medium, the information detected from the trailing end region of the medium, and the information detected from the central region of the medium match each other, it can be said that the information is information obtained from the setting sheet 60, that is, the setting information.

In step S330, the control unit 11 formally stores the information temporarily stored in step S322, as the setting information, in the storage unit 12 or a predetermined memory other than the storage unit 12. When the setting information that has been formally stored in previous step S330 is present at the time of executing step S330, the control unit 11 overwrites the setting information that has been stored, with setting information to be stored in current step S330. Note that, the formally storing in step S330 is just a phrase based on a premise of the expression of the temporarily storing or the temporary storage in step S322. Step S330 corresponds to step S130 in the first example and step S230 in the second example.

Step S340 is the same processing as step S140 and step S240. At the time of step S340, the medium as the discharge target, that is, the setting sheet 60 has been transported to the position where the central region 63 faces the third region 56a. Therefore, in step S340, the control unit 11 causes the transportation unit 13 to further transport the setting sheet 60 which has been transported to the position where the central region 63 faces the third region 56a, and discharges the setting sheet 60. After step S340, the control unit 11 performs again the determination of step S300.

The flow of determining "No" in step S320 and executing step S350 is the same as the flow of determining "No" in step S120 and executing step S150, and the flow of determining "No" in step S220 and executing step S250. That is, in step S350, the control unit 11 sets the conditions of the reading processing based on the setting information formally stored in step S330, and executes the reading processing under the set conditions. After step S350, the control unit 11 performs again the determination of step S300.

However, after the determination of "No" in step S320, the determination of step S345 may be performed before the execution of step S350. The control unit 11 determines the presence or absence of the formally stored setting information in step S345, when the formally stored setting information is present ("Yes" in step S345), the control unit 11 proceeds to step S350, and when the formally stored setting information is not present ("No" in step S345), the control unit 11 proceeds to step S360. That is, after the start of the flowchart of FIG. 7, when "No" is determined in step S320 without the execution of step S330 once, since the setting information cannot be obtained from the setting sheet 60, step S350 is not executed.

In step S360, the control unit 11 ends the flowchart after performing predetermined error processing. In the error processing, when the transportation unit 13 or the reading unit 15 is in operation, the operations of the transportation unit 13 and the reading unit 15 are stopped. As a part of the error processing, the control unit 11 causes the display unit of the operation panel 16 to perform an error display indicating that setting information cannot be acquired since the setting sheet 60 is not placed on the medium placement unit 54.

4. Other Embodiments

In the first example, the control unit 11 may cause the detection unit 14 to detect the same region in the medium a plurality of times. For example, in step S110, after the control unit 11 acquires the detection signal from each second sensor 14b in the second region 54b, the control unit 11 controls the transportation unit 13 to transport the lowermost medium among the mediums placed on the medium placement unit 54 to the position where the leading end region of the corresponding medium faces the third region 56a. Then, the control unit 11 performs the determination of step S120 after acquiring the detection signal output from each third sensor 14c in the third region 56a. In step S120 in this case, the control unit 11 determines whether the information expressed by the detection signal acquired from each second sensor 14b in step S110 and the information expressed by the detection signal acquired from each third sensor 14c in step S110 match each other. When the pieces of information match each other, it is determined that the detection of the setting information in step S110 has succeeded, and the process proceeds to step S130, and when the pieces of information do not match each other, it is determined that the detection of the setting information in step S110 has failed, and the process proceeds to step S150.

Figure 8A:
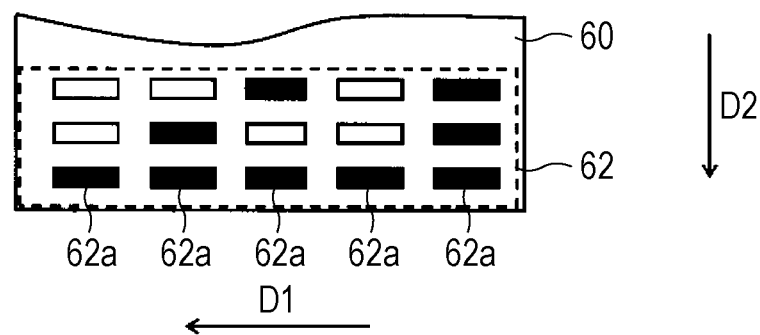
FIG. 8A is a view illustrating an example of a setting sheet including a plurality of setting frame rows in a leading end region.
Figure 8B:
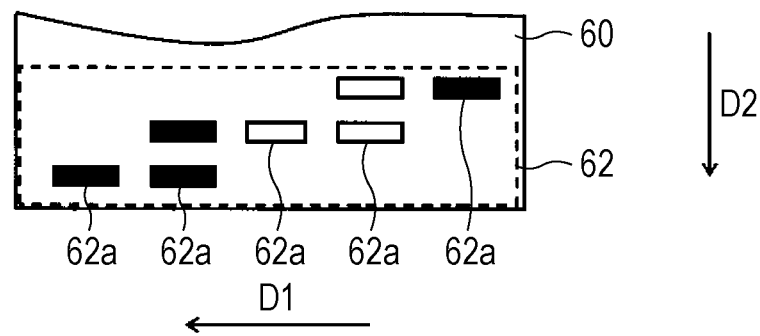
FIG. 8B is a view illustrating an example of a setting sheet including setting frames obliquely disposed in a leading end region.
Figure 8C:
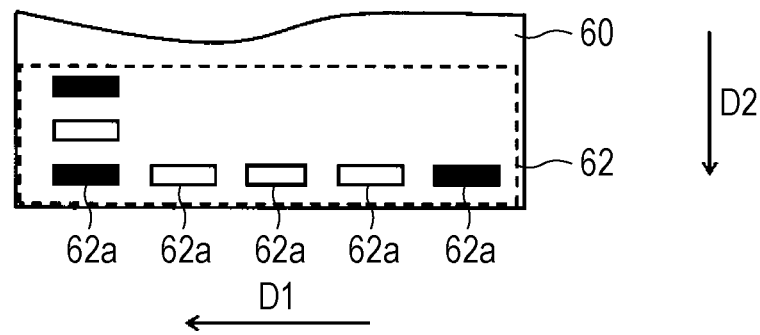
FIG. 8C is a view illustrating an example of a setting sheet including setting frames disposed in an L-shape in a leading end region.

Each of FIGS. 8A, 8B, and 8C illustrates an arrangement example of setting frames in the setting sheet 60. Each of FIGS. 8A, 8B, and 8C illustrates the arrangement example of the setting frames 62a in the leading end region 62 of the setting sheet 60, and the arrangement examples illustrated in FIGS. 8A, 8B, and 8C can be adopted for the setting frames 61a in the trailing end region 61 or the setting frames 63a in the central region 63.

As illustrated in FIG. 8A, the setting frames 62a may be arranged such that a plurality of setting frame rows, each of which is composed of a plurality of setting frames 62a arranged along the first direction D1, are arranged along the transportation direction D2. It is possible to express more types of setting information in the leading end region 62 by increasing the number of setting frames 62a included in the leading end region 62.

As illustrated in FIG. 8A, when a plurality of setting frame rows are included in the leading end region 62, one row may be a specific pattern indicating that the medium is the setting sheet 60 and the setting information may be expressed by the other setting frame rows except the one row. In the example of FIG. 8A, the setting frame row closest to the leading end of the setting sheet 60 among the setting frame rows in the leading end region 62 is the specific pattern in a state where all the setting frames 62a are painted. In the first example, the control unit 11 acquires the detection signal output from each second sensor 14b in the second region 54b in step S110, and determines whether the specific pattern has been detected from the leading end region of the medium based on the corresponding detection signal in step S120. When the specific pattern has been detected from the leading end region of the medium, the control unit 11 determines that the detection of the setting information in step S110 has succeeded, and proceeds to step S130, and when the specific pattern has not been detected from the leading end region of the medium, the control unit 11 determines that the detection of the setting information in step S110 has failed, and proceeds to step S150. In this case, in step S130, the control unit 11 stores, as the setting information, the detection signals except the detection signal corresponding to the specific pattern, among the detection signals from the second sensors 14b acquired in step S110.

It is expected that holes and printing of the document which are likely to be erroneously detected as the setting frames of the setting sheet 60 are regularly arranged in the vertical or horizontal direction. Thus, the arrangement of the setting frames may be irregular.

For example, as illustrated in FIG. 8B, the setting frames 62a may be arranged such that a plurality of setting frames 62a are arranged obliquely with respect to the first direction D1 and the transportation direction D2. In the first example, the control unit 11 acquires the detection signal output from each second sensor 14b in the second region 54b in step S110, and determines the presence or absence of the plurality of setting frames obliquely arranged, based on the corresponding detection signal in step S120. When it is determined that the plurality of setting frames obliquely arranged are present, the control unit 11 determines that the detection of the setting information in step S110 has succeeded, and proceeds to step S130, and when it is determined that the plurality of setting frames obliquely arranged are not present, the control unit 11 determines that the detection of the setting information in step S110 has failed, and proceeds to step S150.

As illustrated in FIG. 8C, the setting frames 62a may be arranged in an L-shape such that a setting frame row in which a plurality of setting frames 62a are arranged along the first direction D1 and a setting frame row in which a plurality of setting frames 62a are arranged along the transportation direction D2 are combined. In the first example, the control unit 11 acquires the detection signal output from each second sensor 14b in the second region 54b in step S110, and determines the presence or absence of the plurality of setting frames arranged in an L-shape, based on the corresponding detection signal in step S120. When it is determined that the plurality of setting frames arranged in an L-shape are present, the control unit 11 determines that the detection of the setting information in step S110 has succeeded, and proceeds to step S130, and when it is determined that the plurality of setting frames arranged in an L-shape are not present, the control unit 11 determines that the detection of the setting information in step S110 has failed, and proceeds to step S150.

When the example as illustrated in FIGS. 8A, 8B, and 8C is adopted, it is required for the image reading apparatus 10 to adopt the detection unit 14 composed of a plurality of sensors which are arranged to be capable of sensing the setting frames arranged as illustrated in FIGS. 8A, 8B, and 8C, or to cause the detection unit 14 to sense each setting frame of the setting sheet 60 while transporting the setting sheet 60.

Figure 9:
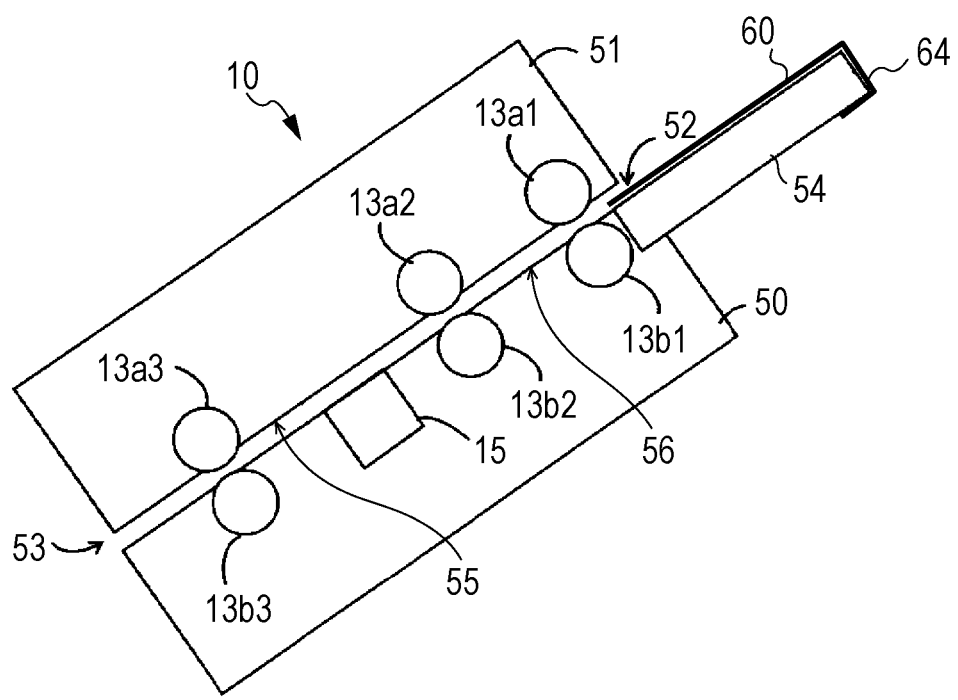
FIG. 9 is a view simply illustrating an image reading apparatus in a state where a non-transportation type setting sheet is placed.

FIG. 9 simply illustrates a mechanical structure of the image reading apparatus 10 including the transportation path 55 similarly to FIG. 2. In the example of FIG. 9, an aspect in which a non-transportation type setting sheet 60 is placed on the medium placement unit 54 is illustrated. The non-transportation type setting sheet 60 is a setting sheet 60 which cannot be transported by the transportation unit 13. Specifically, the non-transportation type setting sheet 60 has a shape in which a portion extending to the upstream side of the trailing end region 61 is bent, and the bent portion (hook unit 64) can be hooked on an upstream-side end portion of the medium placement unit 54, as illustrated in FIG. 9. In a state where the hook unit 64 is hooked on the upstream-side end portion of the medium placement unit 54, the non-transportation type setting sheet 60 has a size so that the leading end does not come into contact with the paper feeding rollers 13a1 and 13b1. Therefore, the non-transportation type setting sheet 60 in a state where the hook unit 64 is hooked on the upstream-side end portion of the medium placement unit 54 is not subjected to the transportation by the transportation unit 13 after the setting frames of the leading end region 62 and the trailing end region 61 are detected by the detection unit 14. The image reading apparatus 10 can set conditions of the reading processing based on the setting information detected from the non-transportation type setting sheet 60 by the detection unit 14, and can execute the reading processing for the document, which is placed on the medium placement unit 54 after the setting of the conditions, under the set conditions.

5. Conclusion

According to the embodiment, the image reading apparatus 10 includes the transportation unit 13 configured to transport the document; the reading unit 15 configured to read the document transported by the transportation unit 13; the medium placement unit 54 which is positioned upstream of the reading unit 15 in the transportation, and on which the document and the setting sheet 60 that includes the setting information for setting the condition of the reading processing of the document are placed; the detection unit 14 which is disposed in the medium placement unit 54, and is configured to detect the setting information from the setting sheet 60 placed on the medium placement unit 54; and the control unit 11 configured to control the reading processing. The control unit 11 sets the condition of the reading processing based on the setting information detected by the detection unit 14, and executes, under the condition that is set, the reading processing including reading of the document by the reading unit 15.

With the configuration, the setting sheet 60 is a medium different from the document. The setting information is detected from the setting sheet 60 by the detection unit 14 disposed in the medium placement unit 54 which is positioned on the upstream side of the reading unit 15 configured to read the document, in the transportation. Therefore, the erroneous recognition hardly occurs and the control unit 11 can easily obtain the setting information accurately compare with the related art of recognizing a mark from the image data generated by the image reading unit reading the document. With the configuration, since the control unit 11 acquires the setting information from the setting sheet 60 by the detection unit 14 before the reading unit 15 reads the document, conditions regarding various kinds of processing including the reading of the document by the reading unit 15 can be set based on the setting information. In addition, since the user can accurately perform desired setting for the image reading apparatus 10 by placing the setting sheet 60 on the medium placement unit 54, the burden on the user is reduced compared to the case of performing setting by operating a UI screen or the like in the related art.

According to the embodiment, the control unit 11 starts transportation of the document by the transportation unit 13 after setting the condition of the reading processing.

With the configuration, the control unit 11 sets the conditions based on the setting information before the transportation unit 13 starts the transportation of the document. Therefore, the control unit 11 can also set the conditions regarding the transportation of the document based on the setting information.

Note that, when the transportation of the document by the transportation unit 13 is excluded from the condition setting based on the setting information, the control unit 11 can perform the transportation of the document by the transportation unit 13 and the condition setting based on the setting information in parallel.

According to the second example or the third example, the detection unit 14 detects the setting information from a plurality of portions of the setting sheet 60, and when pieces of setting information detected by the detection unit 14 from the plurality of portions match each other, the control unit 11 sets the condition of the reading processing based on the setting information that is detected.

With the configuration, it is possible to avoid erroneously recognizing the information detected from the medium that is not the setting sheet 60 as the setting information, and to improve the accuracy of the condition setting using the setting sheet 60.

According to the description of the first, second, and third examples, after setting the condition of the reading processing, the control unit 11 maintains the condition that is set until the setting information is detected by the detection unit 14 from the next setting sheet 60.

That is, the control unit 11 executes the reading processing using the condition setting of the reading processing in steps S150, S250, and S350 until the setting information stored in steps S130, S230, and S330 is updated in next steps S130, S230, and S330. Accordingly, when a user places the bunch of mediums on the medium placement unit 54, the user can freely determine which document is subjected to the reading processing under condition setting by which setting sheet 60 by adjusting the superimposition order of the setting sheet 60 and the document.

According to the embodiment, the control unit 11 sets a storage destination of read data of the document based on the setting information, and stores, in the storage destination that is set, the read data generated by the reading unit 15 reading the document.

With the configuration, the user can store the read data of the document in a desired storage destination in the image reading apparatus 10 by placing the setting sheet 60, in which setting information corresponding to the desired storage destination is expressed, on the medium placement unit 54.

In addition, the embodiment discloses an image reading method including detecting, from the setting sheet 60 placed on the medium placement unit 54, setting information for setting condition of reading processing of a document, the medium placement unit 54 being on the upstream of the reading unit 15 configured to read the document, in the transportation of the document, setting the condition of the reading processing based on the setting information that is detected, and executing the reading processing including reading of the document by the reading unit, under the condition that is set.

In addition, the embodiment discloses a configuration of the image reading system 1 including the image reading apparatus 10, and the server 30 configured to communicate with the image reading apparatus 10. The server 30 stores the table 20 in which the correspondence relationship between the setting information and the condition of the reading processing is prescribed, and the control unit 11 sets the condition of the reading processing based on the setting information detected by the detection unit 14 and the table 20 stored in the server 30, and executes, under the condition that is set, the reading processing including reading of the document by the reading unit 15.

When the setting sheet 60 is the above-described mark sheet type sheet, the setting frames may be provided on both the front and rear surfaces of the sheet. That is, when the detection unit 14 is the reflective sensor capable of sensing each of the front and rear surfaces of the setting sheet 60, the setting sheet 60 having the setting frames on both the front and rear surfaces can be adopted.

The setting sheet 60 is not limited to the above-described mark sheet type or cut-out type sheet. For example, the setting sheet 60 may be a medium with a barcode, a two-dimensional code, or an IC chip in which the setting information is written. In this case, the detection unit 14 is a reader capable of reading the setting information from the barcode, the two-dimensional code, or the IC chip in which the setting information is written.

Alternatively, the setting sheet 60 may be a medium in which the conditions of the reading processing desired by the user are directly written in character strings. In this case, the character strings themselves written in the setting sheet 60 are the setting information of the setting sheet 60. The detection unit 14 reads the setting sheet 60 to extract the character strings written in the setting sheet 60 from the results of the reading, by OCR. The control unit 11 interprets the character strings extracted by the detection unit 14 to recognize the conditions of the reading processing to be set. In such a configuration, the table 20 is not required.

Hereinafter, several specific cases to which the embodiment is applied will be described.

Case 1: Read data of a first document is stored in a first storage destination, and read data of a second document is stored in a second storage destination.

In the case of the related art, the user scans the first document by using a scanner after setting the first storage destination by operating the UI screen or the like, and next, the user scans the second document by using a scanner after setting the second storage destination by operating the UI screen or the like.

In contrast, in the embodiment, the user places a bunch of mediums, in which the first document is superimposed on a first setting sheet 60 having setting information for setting the first storage destination as the storage destination of the read data, a second setting sheet 60 having setting information for setting the second storage destination as the storage destination of the read data is superimposed on the first document, and the second document is superimposed on the second setting sheet 60, on the medium placement unit 54 such that the first setting sheet 60 is at the bottom. In this state, the user instructs the image reading apparatus 10 to start scanning. Then, the control unit 11 executes the above-described flowchart. The control unit 11 sets the storage destination of the read data as the first storage destination based on the setting information detected from the first setting sheet 60 to store the read data of the first document in the first storage destination, and further sets the storage destination of the read data as the second storage destination based on the setting information detected from the second setting sheet 60 to store the read data of the second document in the second storage destination.

Case 2: A document of thin paper is scanned in a low speed mode.

Since the thin paper is a medium that is easily torn more than typical plain paper, it is desirable that the thin paper is transported at a relatively slow speed. In the case of the related art, the user scans the thin paper by using a scanner after setting a low speed mode of which the transportation speed of the document is slower than that of other modes by operating the UI screen or the like. In contrast, in the embodiment, the user superimposes the thin paper document on a third setting sheet 60 having the setting information for setting a low speed mode, and places the thin paper document and the third setting sheet 60 on the medium placement unit 54 such that the third setting sheet 60 is at the bottom. In this state, the user instructs the image reading apparatus 10 to start scanning. Then, the control unit 11 executes the above-described flowchart. The control unit 11 sets the transportation unit 13 at the low speed mode based on the setting information detected from the third setting sheet 60, and transports the document, that is, the thin paper at the low speed mode.

Case 3: Cut paper is scanned after an envelope is scanned.

Since the envelope is likely to be detected as double feeding of the document, it is necessary to disable the double feeding detection mode for the transportation of the envelope. In the case of the related art, the user scans the envelope by using a scanner after setting of disabling the double feeding detection mode by operating the UI screen or the like, and next, the user scans the cut paper by using a scanner after setting of enabling the double feeding detection mode by operating the UI screen or the like. In contrast, in the embodiment, the user places a bunch of mediums, in which the envelope is superimposed on a fourth setting sheet 60 having the setting information for disabling the double feeding detection mode, a fifth setting sheet 60 having the setting information for enabling the double feeding detection mod is superimposed on the envelope, and the cut paper is superimposed on the fifth setting sheet 60, on the medium placement unit 54 such that the fourth setting sheet 60 is at the bottom. In this state, the user instructs the image reading apparatus 10 to start scanning. Then, the control unit 11 executes the above-described flowchart. The control unit 11 performs setting of disabling the double feeding detection mode based on the setting information detected from the fourth setting sheet 60, and then causes the transportation unit 13 to execute the transportation of the document, that is, the envelope. Further, the control unit 11 performs setting of enabling the double feeding detection mode based on the setting information detected from the fifth setting sheet 60, and then causes the transportation unit 13 to execute the transportation of the document, that is, the cut paper.

Case 4: A thick booklet such as a passport is scanned.

When the booklet is scanned, it is necessary to disable the separation mode. In the case of the related art, the user scans the booklet by using a scanner after setting of disabling the separation mode by operating the UI screen or the like, or after disabling the separation mode by directly operating a lever for turning on or off the separation mode provided to the scanner. In contrast, in the embodiment, the user superimposes the booklet on a sixth setting sheet 60 having the setting information for disabling the separation mode, and places the booklet and the sixth setting sheet 60 on the medium placement unit 54 such that the sixth setting sheet 60 is at the bottom. In this state, the user instructs the image reading apparatus 10 to start scanning. Then, the control unit 11 executes the above-described flowchart. The control unit 11 takes a mechanical measure for disabling the separation mode by the transportation unit 13 based on the setting information detected from the sixth setting sheet 60, and then causes the transportation unit 13 to execute the transportation of the document, that is, the booklet.

What is claimed is:

1. An image reading apparatus comprising:
    a transportation unit configured to transport a document;
    a reading unit configured to read the document transported by the transportation unit;
    a medium placement unit which is positioned upstream of the reading unit in a transportation direction, and on which the document and a setting sheet that includes setting information for setting a condition of reading processing of the document are placed;
    a detection unit which is disposed in the medium placement unit, and is configured to detect the setting information from the setting sheet placed on the medium placement unit without reading the setting sheet by the reading unit; and
    a control unit configured to control the reading processing,
    wherein the control unit sets the condition of the reading processing based on the setting information detected by the detection unit, and executes the reading processing including reading of the document by the reading unit, under the condition that is set.

2. The image reading apparatus according to claim 1, wherein the control unit starts transportation of the document by the transportation unit after setting the condition of the reading processing.

3. The image reading apparatus according to claim 1, wherein the detection unit detects the setting information from a plurality of portions of the setting sheet, and when pieces of the setting information detected by the detection unit from the plurality of portions match each other, the control unit sets the condition of the reading processing based on the setting information that is detected.

4. The image reading apparatus according to claim 1, wherein the detection unit is disposed upstream of transportation rollers included in the transportation unit in the transportation, and inside an edge guide that regulates a position of the document and the setting sheet on the medium placement unit.

5. The image reading apparatus according to claim 1, wherein, after setting the condition of the reading processing, the control unit maintains the condition that is set until the setting information is detected by the detection unit from a next setting sheet.

6. The image reading apparatus according to claim 1, wherein the control unit sets a storage destination of read data of the document based on the setting information, and stores, in the storage destination that is set, the read data generated by the reading unit reading the document.

7. An image reading method comprising:
detecting, from a setting sheet placed on a medium placement unit, setting information for setting a condition of reading processing of a document without reading the setting sheet by a reading unit, the medium placement unit being positioned upstream of the reading unit configured to read the document, in transportation of the document;
setting the condition of the reading processing based on the setting information that is detected; and
executing the reading processing including reading of the document by the reading unit, under the condition that is set.

8. An image reading system comprising:
an image reading apparatus; and
a server configured to communicate with the image reading apparatus,
wherein the image reading apparatus includes
a transportation unit configured to transport a document,
a reading unit configured to read the document transported by the transportation unit,
a medium placement unit which is positioned upstream of the reading unit in a transportation direction, and on which the document and a setting sheet that includes setting information for setting a condition of reading processing of the document are placed,
a detection unit which is disposed in the medium placement unit, and is configured to detect the setting information from the setting sheet placed on the medium placement unit without reading the setting sheet by the reading unit, and
a control unit configured to control the reading processing,
the server stores a table in which a correspondence relationship between the setting information and the condition of the reading processing is prescribed, and
the control unit sets the condition of the reading processing based on the setting information detected by the detection unit and the table stored in the server, and executes, under the condition that is set, the reading processing including reading of the document by the reading unit.

\* \* \* \* \*